Patented Aug. 29, 1939

2,171,033

UNITED STATES PATENT OFFICE 2,171,033

PROCESS OF CONTACTING HYDROCARBON VAPORS WITH ZINC CHLORIDE

Franklin E. Kimball, Los Angeles, Calif.

No Drawing. Application May 14, 1938,
Serial No. 207,956

3 Claims. (Cl. 196—36)

This invention is a continuation-in-part of my co-pending application Serial No. 133,262 filed March 26, 1937 for a similar process of refining mineral oil with $NH_4Zn_2Cl_5$ which has been issued as United States Patent No. 2,121,169 on June 21, 1938.

This invention relates to the process of contacting hydrocarbon vapors with zinc chloride in the liquid phase. It has for its object to render the process more expeditious and considerably cheaper.

The prevention of the separation of the solid phase of the zinc chloride has hitherto been effected by the sufficiency of the water necessary to dissolve the zinc chloride. This presence of the sufficiency of the water necessary to dissolve the zinc chloride has hitherto been effected by the sufficiency of the steam necessary to maintain the equilibrium between the concentration of the water present and the concentration of the steam present. The volume of the hydrocarbon vapors which have hitherto been contacted with the zinc chloride in the liquid phase has hitherto been constricted by this presence of the sufficiency of the steam necessary to maintain the equilibrium between the concentration of the water present and the concentration of the steam present.

Now, instead of incurring this steam constriction of the volume of the hydrocarbon vapors which are contacted with the zinc chloride in the liquid phase, I employ the use of the sufficiency of the ammonium pentachlorodizincate necessary to prevent the separation of the solid phase of the zinc chloride at the temperature below the melting-temperature of zinc chloride and at the temperature above the fusion-temperature of the fused mixture of the ammonium pentachlorodizincate and of the zinc chloride.

The hereinabove used term, namely ammonium pentachlorodizincate, is hereby stipulated to be herein interpreted as being the name of the chemical compound whose chemical composition the scientific means of chemical analysis shows to be conforming to the chemical composition which is represented by the chemical formula $NH_4Zn_2Cl_5$.

Now, for the most part, this employed fused mixture of ammonium pentachlorodizincate and zinc chloride was found to be an eutectic mixture of ammonium pentachlorodizincate and zinc chloride which fluxed at a temperature below 450 degrees Fahrenheit. It was also found that it could be prepared by the means of the employment of the use of ammonium chloride. A first mixture of approximately one part of ammonium chloride and seven parts of zinc chloride was prepared which fluxed at a temperature of approximately 450 degrees Fahrenheit. Also, a second mixture of approximately equi-molecular parts of ammonium pentachlorodizincate and zinc chloride was prepared which fluxed at a temperature of approximately 450 degrees Fahrenheit. These fluxing-temperatures were found to be lower than the melting-temperature of either component of the fluxes. The melting-temperature of the ammonium pentachlorodizincate is approximately 480 degrees Fahrenheit. The melting-temperature of the zinc chloride is approximately 540 degrees Fahrenheit, which is also approximately the degree of heat which decomposes ammonium chloride, which substance does not liquefy from the effect of a sole degree of heat alone. The flux of the first mixture and the flux of the second mixture, both, gave the following results on examination. An excess of the crystalline zinc chloride, added to a portion of the flux, remained in the solid phase at a temperature of approximately 450 degrees Fahrenheit. An excess of the crystalline ammonium pentachlorodizincate, added to a portion of the flux, remained in the solid phase at a temperature of approximately 450 degrees Fahrenheit. An excess of crystalline ammonium chloride, added to a portion of the flux, chemically combined with the zinc chloride to form ammonium pentachlorodizincate at a temperature of approximately 450 degrees Fahrenheit. This was evidenced by the amount of the ammonium pentachlorodizincate which was separated from the flux as a result of the addition of the ammonium chloride. From out of the flux liquefied by the temperature of approximately 450 degrees Fahrenheit, the ammonium pentachlorodizincate was separated sufficiently additionally in amount to effect the return of the ratio of the amounts of the components of the flux to approximately equi-molecular proportions of ammonium pentachlorodizincate and zinc chloride. By the means of chemical analysis the chemical composition of the substance thus separated was found to conform to the chemical composition which is represented by the chemical formula $NH_4Zn_2Cl_5$.

Now, in its application to the cracked hydrocarbon vapors formed from mineral oil containing asphalt, the solid phase of the ammonium pentachlorodizincate receives a protective coating of the carbonized polymerized gums. Various gasoline vapors and various gum-forming impurities become polymerized by the catalytic action of ammonium pentachlorodizincate. Various gasoline vapors, not polymerized by ammonium pentachlorodizincate at temperatures which are lower than the melting-temperature of ammonium pentachlorodizincate, become polymerized by the ammonium pentachlorodizincate at temperatures which are higher than the melting-temperature of the ammonium pentachlorodizincate. At a temperature of approximately 450 to 480 degrees Fahrenheit, it was found that ammonium pentachlorodizincate was in the solid phase, that various gasoline vapors were not polymerized by the ammonium pentachlorodizincate and that the gum-forming impurities were polymerized by the ammonium pentachlorodizincate. At higher temperatures than 480 degrees Fahrenheit the liquid phase of the ammonium pentachlorodizincate could not become enveloped with the protective coating of the carbonized polymerized gums, but an appreciable degree of chemical decomposition of ammonium pentachlorodizincate ensued from the effecting of the liquefaction of the ammonium pentachlorodizincate by the degree of heat solely sufficient to effect the liquefaction of the ammonium pentachlorodizincate by the means of itself alone.

Now then, instead of incurring this envelopment of the ammonium pentachlorodizincate with a protective coating of the carbonized polymerized gums, I employ the use of the sufficiency of the ammonium pentachlorodizincate necessary to prevent the separation of the solid phase of the zinc chloride and also of the sufficiency of the zinc chloride necessary to prevent the separation of the solid phase of the ammonium pentachlorodizincate at the temperature below the melting-temperature of ammonium pentachlorodizincate and at the temperature above the fusion-temperature of the fused mixture of the ammonium pentachlorodizincate and of the zinc chloride.

When petroleum oil containing compounds of sulphur is sufficiently heated, hydrocarbon vapors containing hydrogen sulphide are formed. When the hydrocarbon vapors containing the hydrogen sulphide are contacted with the fused mixture of ammonium pentachlorodizincate and zinc chloride, the hydrogen sulphide decomposes the zinc chloride to form hydrogen chloride and zinc sulphide. It was found that a sufficiency of the hydrogen chloride reversed the equilibrium of the reaction and prevented separation of zinc sulphide. It was effected by the sufficiency of the hydrogen chloride necessary in the vapor phase to maintain the equilibrium between the concentration of hydrogen chloride in the hydrocarbon vapors and the concentration of hydrogen chloride in the fused mixture.

Now then, instead of incurring the formation of zinc sulphide in the contacting of hydrocarbon vapors containing hydrogen sulphide and hydrogen chloride with a fused mixture containing hydrogen chloride, ammonium pentachlorodizincate and zinc chloride, I supply to the hydrocarbon vapors sufficient hydrogen chloride to prevent separation of zinc sulphide and contact the hydrocarbon vapors with a fused mixture containing sufficient hydrogen chloride to prevent separation of zinc sulphide, containing sufficient ammonium pentachlorodizincate to prevent separation of zinc chloride and containing sufficient zinc chloride to prevent separation of ammonium pentachlorodizincate at a temperature below the melting-temperature of ammonium pentachlorodizincate and at a temperature above the fusion-temperature of the mixture.

I will hereinbelow describe a preferred embodiment of my improvements in the processes of contacting hydrocarbon vapors with zinc chloride. The description is of an example which portrays my improvements in an illustrative manner. It is to be understood that my invention is not limited nor restricted to the employment of the uses of the precise mixtures, concentrations, quantities, proportions, temperatures nor pressures whose uses are employed in the operation of the illustrative application which is thus hereinbelow described as being a practical example of the operation of a process portraying my improvements.

In the application of such an illustrative process petroleum oil, which contains compounds of carbon, compounds of hydrogen, compounds of oxygen, compounds of nitrogen and compounds of sulphur, may be continuously supplied to a suitable cracking heater and may be continuously cracked by the processes which are well-known to those who are skilled in the art of manufacturing gasoline from petroleum oil. Thereby there may be continuously formed a vapor phase containing hydrocarbon vapors, polymerizable gum-forming impurities, polymerizable color-forming impurities, polymerizable gasoline vapors, hydrogen, hydrogen sulphide and steam. The cracked hydrocarbon vapors may be continuously separated and withdrawn from the residue not taking the vapor phase. The withdrawn hydrocarbon vapors may then be continuously partially cooled and partially condensed. The partially cooled hydrocarbon vapors may then be continuously separated and withdrawn from the condenser hydrocarbon liquid at a pressure of approximately 170 to 180 pounds per square inch gage pressure and at a temperature of approximately 480 to 520 degrees Fahrenheit. The withdrawn hydrocarbon vapors may then be continuously expanded to a pressure suitable for the effecting of the polymerization of the gum-forming impurities.

The various pressures of the different stages of the application of the treatment for the removal of gum-forming impurities may be satisfactorily controlled by suitable pressure regulators which are well-known to those whom are skilled in the art of treating hydrocarbon vapors. Prior to the entry of the hydrocarbon vapors into a primary bubble-tower, their pressure may be stepped down from the pressure of approximately 170 to 180 pounds per square inch gage pressure to a pressure of approximately 10 to 15 pounds per square inch gage pressure for the making of the subjection of the hydrocarbon vapors to the catalytic polymerization of the gum-forming impurities while they still yet will remain in the superheated condition. Thereupon the polymerized products resulting from the contact with the fused mixture may be readily held in the vapor phase because the temperature of the hydrocarbon vapors is still yet above the temperature of the condensation of the polymerized gum-forming impurities at the pressure whose use is being employed in the making of the application of the polymerization treatment with the fused mixture. Thereupon there is effected a more efficient contact with the catalyzing molecules of the fused mixture.

The expanded hydrocarbon vapors may then continuously be measured by passing them through suitable orifice meters which are well-known by those whom are skilled in the art of measuring vapors. The measured hydrocarbon vapors may then continuously be passed through suitable acid-proof equipment leading to the primary bubble-tower. The primary bubble-tower is also constructed of the acid-proof materials which are well-known to those whom are skilled in the art of treating hydrocarbon vapors with hydrogen chloride.

Prior to the passing of the measured hydrocarbon vapors into the bottom of the primary bubble-tower, they may first continuously be passed into the bottom of a suitable acid-vaporizing tower and then continuously be withdrawn from it at the top thereof. The acid-vaporizing tower may be packed with suitable lumps of silica quartz which are well-known by those whom are skilled in the art of treating hydrocarbon vapors with hydrogen chloride. For each 1000 liters of the measured hydrocarbon vapors at the temperature of approximately 480 to 520 degrees Fahrenheit and at the pressure of approximately 10 to 15 pounds per square inch gage pressure which may continuously be passed into the bottom of the quartz acid-vaporizing tower, approximately 200 to 300 cubic centimeters of an aqueous solution containing approximately 30 to 32 per cent by weight of the hydrogen chloride may continuously be passed into the top of the quartz acid-vaporizing tower. The measured hydrocarbon vapors pass upwardly through the interstices between the lumps of quartz to maintain a hot acid-vaporizing tower. The measured aqueous solution of the hydrogen chloride trickles downwardly over the lumps of quartz to evaporate off into the rising counter-current of the measured hydrocarbon vapors to provide the presence of the sufficiency of the concentration in the vapor phase of the hydrogen chloride necessary to maintain the equilibrium with the presence of the sufficiency of the concentration in the liquid phase of the hydrogen chloride necessary to prevent the separation of the zinc sulphide when the hydrocarbon vapors containing the hydrogen sulphide subsequently contact the hydrogen chloride contained liquid phase composed of the fused mixture of the ammonium pentachlorodizincate and the zinc chloride. The withdrawn vapor phase containing the hydrocarbon vapors also contains an approximately 3 to 5 per cent by volume of the hydrogen chloride which has been added to the vapor phase.

The hydrocarbon vapors, containing approximately 3 to 5 per cent by volume of hydrogen chloride at a temperature of approximately 450 to 480 degrees Fahrenheit and at a pressure of approximately 10 to 15 pounds per square inch gage pressure, may then continuously be passed into the bottom of a suitable primary bubble-tower and continuously be withdrawn from it at the top thereof. A fused mixture, containing approximately 70% NH$_4$Zn$_2$Cl$_5$ and 30% ZnCl$_2$ at a temperature of approximately 450 to 480 degrees Fahrenheit, may then continuously be passed into the top of the primary bubble-tower and continuously be withdrawn from it at the bottom thereof. Within the primary bubble-tower the hydrocarbon vapors are brought into contact with the fused mixture of ammonium pentachlorodizincate and zinc chloride by bubbling therethrough in a series of superimposed pans which are well-known to those whom are skilled in the art of treating hydrocarbon vapors with zinc chloride in the liquid phase. The vapors, from off of the top of each pan below, pass into the pan above at a point beneath the surface of the liquid therein. The fused mixture, from off of the top of each pan above, passes into the pan below at a point beneath the surface of the liquid therein.

The treating of the acidified hydrocarbon vapors in the primary bubble-tower may be controlled by the means of manipulations of the amounts of the ingredients of the fused mixtures which are continuously being passed into the top of the primary bubble-tower. If expressed in the terms computed into the amounts of ammonium chloride and zinc chloride used per barrel of the condensed gasoline stock, there may continuously be passed into the top of the primary bubble-tower approximately three pounds of the ammonium chloride and approximately twenty-one pounds of the zinc chloride for each barrel of the gasoline stock which is continuously being passed into the bottom of the primary bubble-tower. By the means of the manipulations of the amounts of the ammonium chloride and of the zinc chloride which are continuously being passed into the top of the primary bubble-tower, the resulting composition of the fused mixture, which is continuously being withdrawn from the bottom of the primary bubble-tower, is thereby carefully maintained at the proportion of approximately 70% NH$_4$Zn$_2$Cl$_5$ to prevent separation of ZnCl$_2$ and of approximately 30% ZnCl$_2$ to prevent separation of NH$_4$Zn$_2$Cl$_5$. It was found that such a fused mixture was made up from approximately 11 to 15 per cent of the ammonium chloride and from approximately 85 to 89 per cent of the zinc chloride.

The temperature of the treating of the acidified hydrocarbon vapors within the primary bubble-tower may also be controlled by the means of the manipulations of the amounts and temperatures of the hydrocarbon vapors and of the fused mixtures which are continuously being passed into the primary bubble-tower. Thereby the temperature of the fused mixture which is continuously being withdrawn from the bottom of the primary bubble-tower may carefully be maintained at the temperature of approximately 450 to 480 degrees Fahrenheit.

Gaseous ammonia may then continuously be passed into the hydrocarbon vapors which have been withdrawn from the top of the primary bubble-tower at a point just before they pass beneath the surface of the liquid in the suitable secondary bubble-tower. The ammonia may be added to the hydrocarbon vapors in quantities which are sufficient to render neutralization to the amount of the hydrogen chloride present whereby the hydrocarbon vapors become rendered slightly ammoniacally alkaline. For each volume of the hydrogen chloride present in the withdrawn acidified hydrocarbon vapors there is supplied approximately one volume of the gaseous ammonia to render alkaline the hydrocarbon vapors; i. e. 3 to 5%.

The ammoniacally alkaline hydrocarbon vapors may then continuously be supplied to the bottom of the secondary suitable bubble-tower and continuously be withdrawn from it at the top thereof. The aqueous solutions of calcium chloride may then continuously be passed into the top of the secondary bubble-tower and continuously be withdrawn from it at the bottom thereof. Within the secondary bubble-tower the hydrocarbon vapors may be brought into contact with the aqueous calcium chloride solution by bubbling therethrough in a series of superimposed pans such as are well-known to those skilled in the art of treating hydrocarbon vapors. The vapors, from off of the top of each pan below, pass into the pan above at a point beneath the surface of the liquid therein. The calcium chloride solution, from off of the top of each pan above, passes into the pan below at a point beneath the surface of the liquid therein. The calcium chloride solution partially cools and partially condenses the hydrocarbon vapors whereby a hydrocarbon liquid containing the polymerized gum-forming impurities is formed. The condensing hydrocarbon vapors generate steam from the aqueous calcium chloride solution whereby the maintaining in the vapor phase of the non-condensed hydrocarbon vapors is facilitated. The calcium chloride solution also extracts ammonium chloride from the vapors. The condensed hydrocarbon liquid also extracts from the non-condensed hydrocarbon vapors polymerized color-forming impurities that are resultant of the zinc chloride catalysis in the primary treatment. Both the aqueous solution of the calcium chloride and the condensed gum-containing hydrocarbon liquid may continuously be withdrawn from the bottom of the secondary bubble-tower.

The treating of the alkaline hydrocarbon vapors in the secondary bubble-tower may be controlled by the means of the manipulations of the amounts of the water and the amounts of the calcium chloride that are being passed into the top of the secondary bubble-tower. It is aimed to supply approximately eighty pounds of the calcium chloride in aqueous solution for each barrel of the gasoline which is supplied for the treatment. This is in order to adequately flush away the condensing hydrocarbon liquid. Additional amounts of the calcium chloride may be supplied to the top of the secondary bubble-tower to provide for the removal of additional amounts of the condensing hydrocarbon liquid. Additional amounts of water may be passed into the top of the secondary bubble-tower also in such quantities as are sufficient to replace such amounts of the water as may have been vaporized in the application of the treatment. By the means of the manipulations of the amounts of the water and of the amounts of the calcium chloride being passed into the top of the secondary bubble-tower, the resulting composition of the aqueous calcium chloride solution which is being withdrawn from the bottom of the secondary bubble-tower may be carefully maintained within the proportions of approximately 35 to 45 per cent of water and 50 to 60 per cent of calcium chloride.

The temperature of this exit flow of the calcium chloride in the aqueous solution may also carefully be maintained at a temperature of approximately 275 to 325 degrees Fahrenheit by the means of the manipulations of the pressures and temperatures of the hydrocarbon vapors which are continuously being supplied for the subjection to the treatment with a maintained mixture of water and calcium chloride.

The withdrawn hydrocarbon vapors from off of the top of the secondary bubble-tower may then continuously be cooled and condensed whereby liquefied gasoline stock is continuously formed. The liquefied gasoline stock may then continuously be separated and be withdrawn from the non-condensed vapor phase.

The dissolved hydrogen sulphide may then be removed from the liquefied gasoline stock by the means of the employment of the use of an aqueous solution of sodium hydroxide. A treatment with an aqueous solution of sodium plumbite and subsequently with sulphur may then be applied by the various processes which are well-known to those whom are skilled in the art of manufacturing cracked gasoline from petroleum oil containing compounds of sulphur.

Although I have hereinabove shown and described only one process which embodies my invention in the contacting of hydrocarbon vapors with zinc chloride, it is to be understood that various changes and modifications may be made in the making of the applications of my improvements in the processes of contacting hydrocarbon vapors with zinc chloride without departing from the spirit of the invention and the spirit and scope of the appended claims.

I claim:
1. A process which comprises contacting hydrocarbon vapors containing gum-forming impurities with a fused treating-mixture containing approximately 70% $NH_4Zn_2Cl_5$ to prevent separation of $ZnCl_2$ and containing approximately 30% $ZnCl_2$ to prevent separation of $NH_4Zn_2Cl_5$ at a temperature below 480 degrees Fahrenheit and at a temperature above the fusion-temperature of the treating-mixture, supplying $NH_4Zn_2Cl_5$ and $ZnCl_2$ to the treating-mixture, separating and withdrawing the contacted hydrocarbon vapors from the treating-mixture, withdrawing from the treating-mixture a mixture of $NH_4Zn_2Cl_5$ and $ZnCl_2$ containing products of treatment, partially liquefying the withdrawn hydrocarbon vapors to degum the hydrocarbon vapors, separating and withdrawing the degummed hydrocarbon vapors from the gum-containing hydrocarbon liquid and withdrawing the gum-containing hydrocarbon liquid.

2. A process which comprises contacting hydrocarbon vapors with a fused treating-mixture containing approximately 70% $NH_4Zn_2Cl_5$ to prevent separation of $ZnCl_2$ and containing approximately 30% $ZnCl_2$ to prevent separation of $NH_4Zn_2Cl_5$ at a temperature below 480 degrees Fahrenheit and at a temperature above the fusion-temperature of the treating-mixture, supplying $NH_4Zn_2Cl_5$ and $ZnCl_2$ to the treating-mixture, separating and withdrawing the contacted hydrocarbon vapors from the treating-mixture and withdrawing from the treating-mixture a mixture of $NH_4Zn_2Cl_5$ and $ZnCl_2$ containing products of treatment.

3. A process which comprises contacting hydrocarbon vapors with a fused treating-mixture containing approximately 70% $NH_4Zn_2Cl_5$ to prevent separation of $ZnCl_2$ and containing approximately 30% $ZnCl_2$ to prevent separation of $NH_4Zn_2Cl_5$ at a temperature below 480 degrees Fahrenheit and at a temperature above the fusion-temperature of the treating-mixture.

FRANKLIN E. KIMBALL.